(12) United States Patent
Xiong et al.

(10) Patent No.: US 12,354,280 B2
(45) Date of Patent: Jul. 8, 2025

(54) RECONSTRUCTING A THREE-DIMENSIONAL SCENE

(71) Applicant: Samsung Electronics Co., Ltd., Suwon-si (KR)

(72) Inventors: Yingen Xiong, Mountain View, CA (US); Christopher Peri, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 389 days.

(21) Appl. No.: 17/875,429

(22) Filed: Jul. 28, 2022

(65) Prior Publication Data
US 2023/0245322 A1 Aug. 3, 2023

Related U.S. Application Data

(60) Provisional application No. 63/304,492, filed on Jan. 28, 2022.

(51) Int. Cl.
*G06V 10/00* (2022.01)
*G06T 7/20* (2017.01)
(Continued)

(52) U.S. Cl.
CPC ............... *G06T 7/20* (2013.01); *G06T 7/593* (2017.01); *G06T 17/00* (2013.01); *H04N 13/106* (2018.05);
(Continued)

(58) Field of Classification Search
CPC G06T 7/20; G06T 7/593; G06T 17/00; G06T 2207/10012; G06T 2207/10021;
(Continued)

(56) References Cited

U.S. PATENT DOCUMENTS 8,855,408 B2 10/2014 Kim
8,976,186 B2 3/2015 Yu
(Continued)

FOREIGN PATENT DOCUMENTS

CN 103049929 A 4/2013
CN 111882576 A * 11/2020
(Continued)

OTHER PUBLICATIONS

C. Wang et al., "DymSLAM: 4D Dynamic Scene Reconstruction Based on Geometrical Motion Segmentation," in IEEE Robotics and Automation Letters, vol. 6, No. 2, pp. 550-557, Apr. 2021 (Year: 2021).*
(Continued)

*Primary Examiner* — Vu Le
*Assistant Examiner* — Zaid Muhammad Saleh

(57) ABSTRACT

In one embodiment, a method includes identifying, in each image of a stereoscopic pair of images of a scene at a particular time, every pixel as either a static pixel corresponding to a portion of a scene that does not have local motion at that time or a dynamic pixel corresponding to a portion of a scene that has local motion at that time. For each static pixel, the method includes comparing each of a plurality of depth calculations for the pixel, and when the depth calculations differ by at least a threshold amount, then re-labeling that pixel as a dynamic pixel. For each dynamic pixel, the method includes comparing a geometric 3D calculation for the pixel with a temporal 3D calculation for that pixel, and when the geometric 3D calculation and the temporal 3D calculation are within a threshold amount, then re-labeling the pixel as a static pixel.

20 Claims, 4 Drawing Sheets

(51) Int. Cl.
*G06T 7/593* (2017.01)
*G06T 17/00* (2006.01)
*H04N 13/106* (2018.01)
*H04N 13/00* (2018.01)

(52) U.S. Cl.
CPC .............. *G06T 2207/10012* (2013.01); *G06T 2207/10021* (2013.01); *G06T 2207/30244* (2013.01); *H04N 2013/0081* (2013.01); *H04N 2013/0085* (2013.01)

(58) Field of Classification Search
CPC ... H04N 2013/0081; H04N 2013/0085; H04N 13/122; H04N 13/128
See application file for complete search history.

(56) References Cited

U.S. PATENT DOCUMENTS

| | | | |
|---|---|---|---|
| 9,542,750 | B2 | 1/2017 | Muninder |
| 10,672,188 | B2 | 6/2020 | Bleyer |
| 10,769,849 | B2 | 9/2020 | Uyyala |
| 10,832,078 | B2 | 11/2020 | Cansizoglu |
| 10,951,843 | B2 | 3/2021 | Lin |
| 11,263,810 | B2 | 3/2022 | Bleyer |
| 11,288,819 | B2 | 3/2022 | Große |
| 2017/0032192 | A1 | 2/2017 | Teichman |
| 2019/0251931 | A1* | 8/2019 | Oh .......................... G06T 7/20 |
| 2020/0195904 | A1 | 6/2020 | Tauber |
| 2020/0410693 | A1* | 12/2020 | Große .................... G06T 7/97 |

FOREIGN PATENT DOCUMENTS

| | | |
|---|---|---|
| JP | 2017-219351 | 12/2017 |
| KR | 10-1856257 | 5/2018 |
| KR | 10-1983586 | 9/2019 |
| KR | 10-1983586 B1 | 9/2019 |
| KR | 10-2021-0058686 | 5/2021 |

OTHER PUBLICATIONS

International Search Report and Written Opinion in Application No. PCT/KR2023/001361, May 12, 2023.
Extended European Search Report in Application No. 23747413.5-1207 / 4392940 PCT/KR2023001361, Nov. 19, 2024.

* cited by examiner

RECONSTRUCTING A THREE-DIMENSIONAL SCENE

PRIORITY CLAIM

This application claims the benefit under 35 U.S.C. 119 of U.S. Provisional Patent Application No. 63/304,492 filed Jan. 28, 2022, the entirety of which is incorporated herein by reference.

TECHNICAL FIELD

This disclosure generally relates to reconstructing a three-dimensional scene.

BACKGROUND

Stereoscopic images of a scene, such as a "left" image taken by one camera and a "right" image taken by a second, offset camera, can be used to generate three-dimensional information about the scene, such as the x-y positions of pixels in the images and depth information for those pixels. Stereoscopic images may be processed and presented to a user, such as by a head-worn device, such that the user's left eye views the "left" image and the user's right eye views the "right" image, creating the perception of viewing a three-dimensional scene.

Once three-dimensional information of a scene has been obtained, virtual reality (VR) or augmented reality (AR) content may be presented to a user. For example, if a user is viewing a scene, e.g., by a viewing the actual scene through a transparent head-worn display, then a virtual object may be superimposed on the display such that the object appears to be present in the real-world three-dimensional scene the user is viewing. However, in order to realistically superimpose the object so that it appears to be part of the real-world three-dimensional scene, three-dimensional information about the scene must first be determined by reconstructing the three-dimensional scene.

DESCRIPTION OF EXAMPLE EMBODIMENTS

In order to properly display a three-dimensional scene, for example on a head-worn display such as augmented reality (AR) or virtual reality (VR) headset, three-dimensional image input (such as a pair of stereoscopic images) needs to be reconstructed into a 3D scene. 3D scene reconstruction involves, for example, accurately determining the depth of image content in the scene, such as objects, as well as the relative location of content in the scene. For example, in order to accurately create AR content in a scene, relative depths and locations of content in the scene must be properly determined and reconstructed so that the AR content can be accurately placed within the scene. However, if some of the content in the scene is moving, then reconstruction becomes more challenging. This is particularly true because motion in a scene may be due to global motion, such as movement of the cameras capturing the scene, for example if the cameras are part of a head-worn device, or may be due to local motion within the scene, such as movement of objects in the scene relative to each other, or may be due to both local and global motion at the same time. As used herein, a scene is static if there is no local motion in the scene, although there may be global motion, and a scene is dynamic if there is local motion in the scene.

Figure 1:
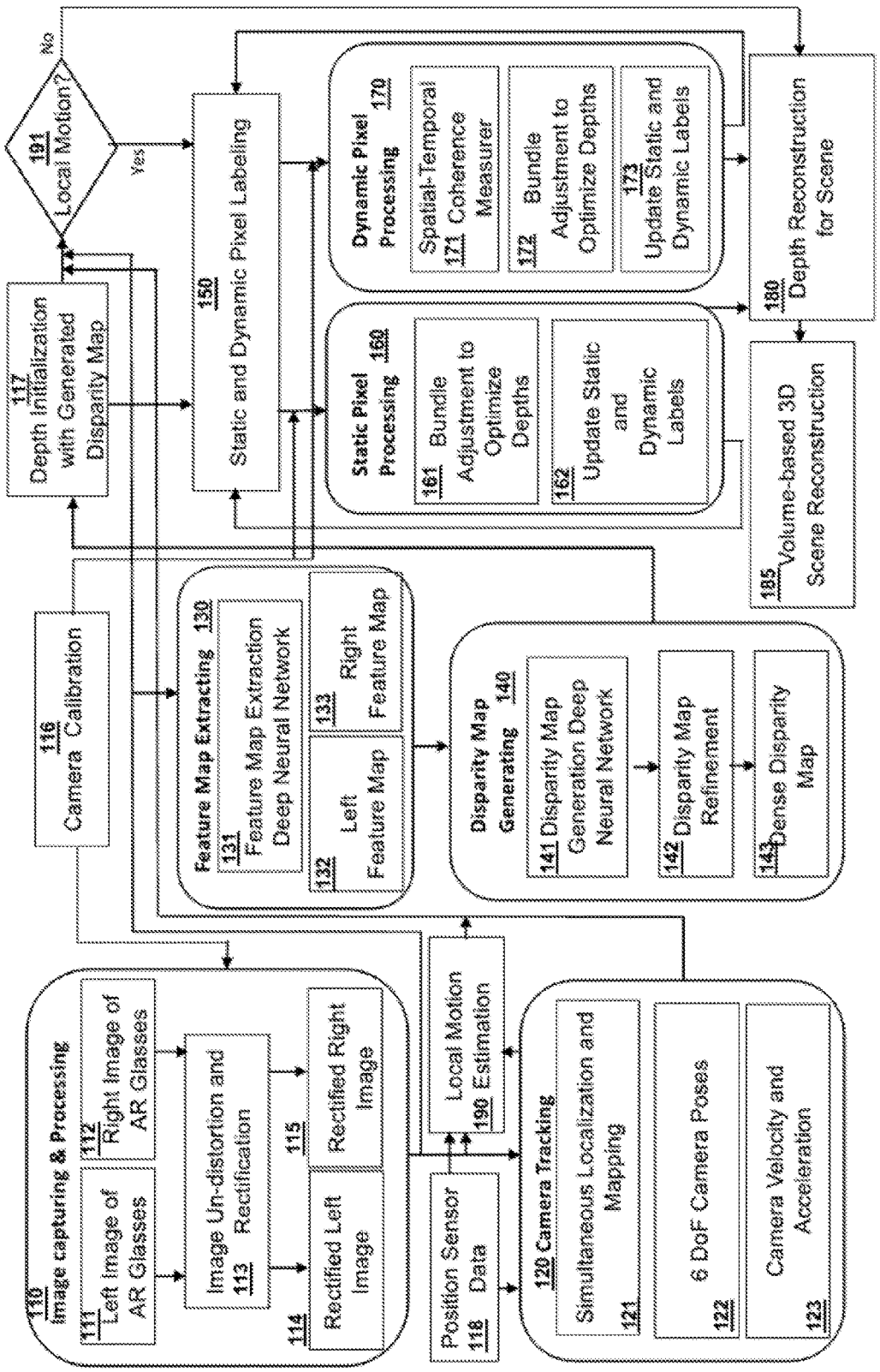
FIG. 1 illustrates an example approach for reconstructing a three-dimensional scene that may have dynamically moving content.

FIG. 1 illustrates an example approach for reconstructing a three-dimensional scene that may have dynamically moving content. As explained more fully herein, embodiments of this disclosure may not include all the example features illustrated and described with reference to the example embodiment of FIG. 1. Moreover, while the example of FIG. 1 at times refers to AR glasses as a specific example of a device that may be used for capturing and reconstructing 3D content, this disclosure contemplates any suitable arrangement for capturing and reconstructing 3D content. For example, two or more cameras may be used to capture stereoscopic image pairs as part of a head-worn or body-worn device, or as part of another camera system that is not worn by a user, whether or not such content is necessarily used for AR content. As another example, some or all of the processing for 3D scene reconstruction may be performed on a local device, such as by hardware or software (or both) of a head-worn device such as a smartphone or AR glasses. In particular embodiments, some or all of the processing for 3D scene reconstruction may be performed by one or more remote devices, such as by a server device.

As show in the example of FIG. 1, an example approach for reconstructing a three-dimensional scene may include image capturing and processing module 110. For example, image capturing and processing module 110 may include a pair of stereoscopic cameras for capturing a pair of stereoscopic images (e.g., a "left" image 111 and a "right" image 112, together forming a stereoscopic image pair). Image capturing and processing module 110 may preform one or more image processing techniques on captured images, such as for example image un-distortion and rectification 113, in order to produce a rectified pair of images such as rectified left image 114 and rectified right image 115. For example, an image captured by a camera may be distorted, for example due to the camera using a fish-eye lens that has a wide field of view but that introduces geometric distortion, and un-distortion may be used to correct these geometric artifacts. As another example, rectification may be used to correct the physical displacement of feature points between two images, e.g., by ensuring that corresponding pixels of a particular features in a left image and right image are on the same horizontal (e.g., epipolar) line.

The example approach illustrated in FIG. 1 may obtain position sensor data 118 from one or more position sensors that detect the position of a camera used to capture an image. For example, one or more position sensors may be used to track the device position and/or motion of the device on which cameras are mounted, such as for example the position and pose of an AR glasses, and then the position and pose of each camera can be obtained from the known position of the cameras relative to the headset. This disclosure contemplates any suitable position sensor or combination of position sensors, such as for example one or more gyroscope, accelerometers, and/or inertial measurement units.

The example approach illustrated in FIG. 1 may use camera tracking 120 to track the position and motion of one or more cameras used to capture pairs of stereoscopic images. For example, simultaneous locational and mapping (SLAM) 121 may be used to determine each camera's motion and position, including, for example, camera poses in 6 degrees-of-freedom 122 (e.g., the position of the camera in three-dimensional space as well as the rotational pose of the camera, e.g. with reference to three orthogonal rotational axes). In addition, positional data such as position sensor data 118 may be used to determine each camera's velocity and acceleration 123. Camera tracking 120 may also use image-based tracking, such as visual odometry, to determine the position, motion, and/or orientation of cameras used to capture stereoscopic images. Output from both captured images and positional sensors, such as IMUS, may be combined to determine the position, orientation, and/or motion of the cameras. In particular embodiments, other kinds of positional and motion data may be combined to track the motion, pose, and position of cameras. For example, output from, e.g., an IMU may be combined with output from, e.g., a depth sensor to track the motion, pose, and position of cameras.

As illustrated in the example of FIG. 1, position sensor data 118 may be used to determine the motion of a camera. In addition, camera tracking 120 may also be used to determine the motion of a camera, by using image data that, in particular embodiments, may be supplemented with data from position sensor data 118. Each approach may be used to estimate the motion of a camera at a particular point in time. As illustrated in FIG. 1, camera calibration 116 may be used to perform image processing, and in particular embodiments, camera calibration may also be used in conjunction with position sensor data 118 to determine camera pose.

In particular embodiments, as shown in FIG. 1, pose information determined using sensor data 118 can be compared with pose information determined using camera tracking techniques 120 to make a local motion estimation 190, which estimates whether content in a captured scene is moving and, as explained more fully below, in particular embodiments may make an estimate of which portion(s) of the scene contain local motion. For example, position sensor data 118 can detect movement or certain pose information of a camera, but cannot determine whether movement in a scene captured by the camera is occurring. Conversely, the image-based camera tracking techniques 120 can detect motion that is occurring in a scene, but cannot accurately determine whether such motion is due to movement of a camera (which, in a sequence of image captured by a camera, would appear as motion of the scene) or due to actual motion within the scene.

Figure 2:
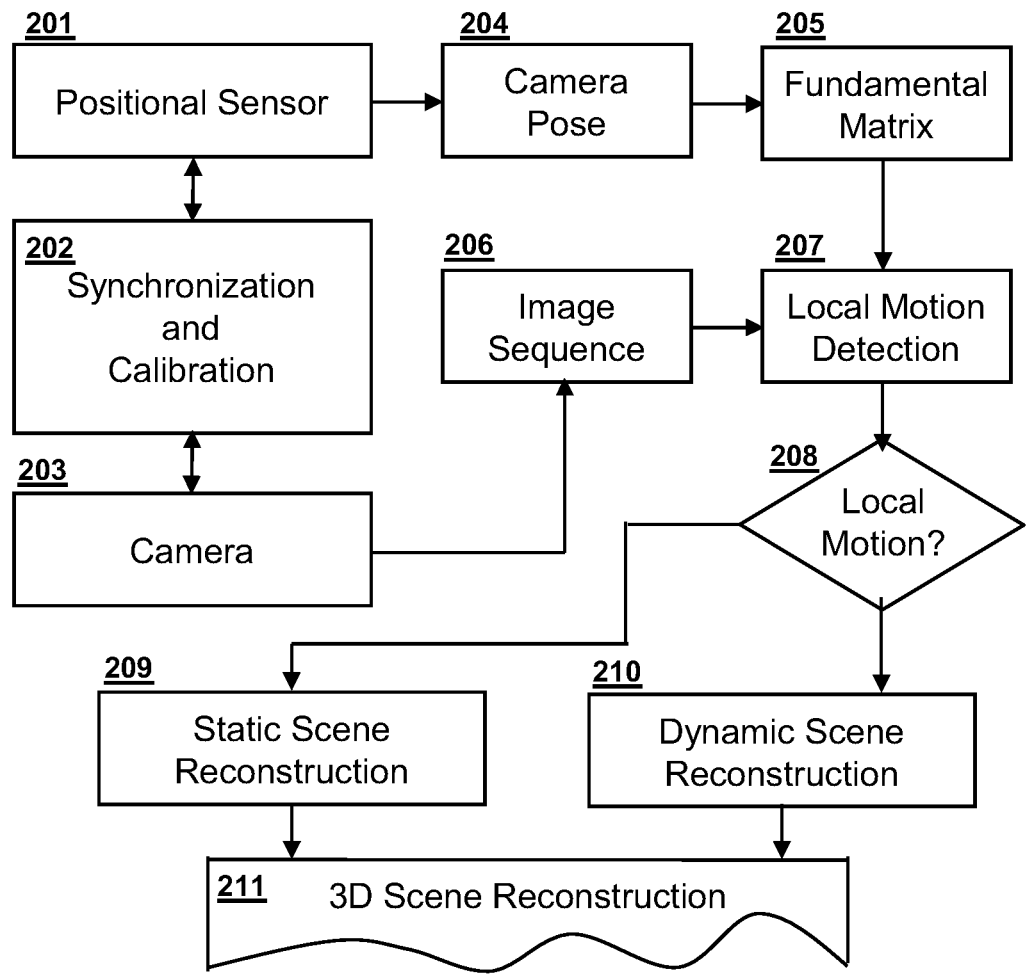
FIG. 2 illustrates an example method for determining whether to use dynamic or static scene reconstruction.

FIG. 2 illustrates an example technique for determining whether local motion in a scene is occurring. As shown in FIG. 2, positional sensor data from a positional sensor 201, such as an IMU, may be used to determine pose of a pair of cameras (for example, by determining the pose of a head-worn device on which both cameras are fixed, and the translation to each camera is known) to obtain information about each camera's rotation and translation for each camera frame. Using camera pose information 204, a fundamental matrix 205 can be determined representing the pose relationship between the pairs of cameras. Fundamental matrix 205 does not depend on local motion in a scene, as it is derived from one or more positional sensors 201.

As illustrated in FIG. 2, positional sensors 201 and cameras 203 are synchronized and calibrated, as illustrated in 202, so that the positional sensors 201 can track the camera pose 204. Also, cameras 203 capture pairs of images to create an image sequence 206, which as explained above does capture movement in a scene. For each pixel in a pair of images in image sequence 206, a fundamental matrix can be determined, and for each pixel 3D information about that pixel can be determined using the fundamental matrices generated from image sequence 206 and, separately, 3D information for that pixel can be generated using fundamental matrix 205 for that image. A local motion detection 207 can be made by comparing the 3D information computed for each pixel using the two different fundamental matrices, and if the overall difference between the two pathways for a given pair of images is greater than a threshold, then at step 208 a determination is made that local motion exists in a scene. If not, then a determination can be made that no local motion exists in the scene for that frame, even though global motion may be occurring due to, e.g., movement of the headset.

If the difference between 3D information for a set of pixels in an image frame computed using pathway 201-204-205 and 3D information for a set of pixels in an image frame computed using pathway 203-206 is greater than a threshold, then a system such as the example approach of FIG. 1 may reconstruct a 3D scene using a dynamic scene reconstruction 210, as described more fully herein. Otherwise, the 3D scene may be reconstructed using a static scene reconstruction 209, and 3D scene reconstruction 211 is the end result of either approach.

As illustrated in FIG. 1, particular embodiments disclosed herein can estimate whether local motion has occurred in a scene and perform 3D scene reconstruction accordingly, by using static scene reconstruction when no local motion is detected in an image frame and using dynamic scene reconstruction when local motion is detected in an image frame. This detection and decision approach, such as for example the technique shown in FIG. 2, can provide many computational benefits. For example, if no local motion is detected, then only static reconstruction needs to be used, which saves computational resources and computational power relative to a dynamic reconstruction path, for example by reducing the calculation step (e.g., consistency tests, refinements, etc) necessary for a dynamic reconstruction path. However, when local motion is present, then dynamic reconstruction can be used to accurately reconstruct the scene, but the resources associated with improved reconstruction can be reserved only for when they are needed, i.e., when local motion is present in the scene. As explained above, in particular embodiments a scene-reconstruction decision (such as local motion decision 208 of FIG. 2) may be used on a frame-by-frame basis. In particular embodiments, such decisions may apply to, e.g., a series of frames or to a single frame representing a series, such as a key frame.

As explained above, FIG. 2 illustrates an example technique for determining whether local motion in a scene is occurring so that a local motion estimation 190 (as illustrated in FIG. 1) can be made. The approach of FIG. 1 includes feature map extracting 130 and disparity map generating 140. As shown in FIG. 1, feature map extraction, performed for each image of a pair of stereoscopic images, may be performed using a deep neural network 131 to generate a left feature map 132 (i.e., from rectified left image 114) and a right feature map 133 (i.e., from rectified right image 115). The output from feature map extraction may be used for disparity map generating 140, which as illustrated in FIG. 1, may be performed using a deep neural network 141. Disparity map generation may not always result in a complete disparity map, e.g., because features may not be detectable for each scene or for portions of a scene, and therefore disparity map refinement 142 may be performed to create a dense disparity map 143, as the output of deep neural network may be a sparse disparity map, as discussed above.

While the discussion above describes feature map extraction and disparity map reconstruction using a deep neural network, other processes may be used to extract features and reconstruct depths, for example extracting image features from rectified stereo image pairs by image processing, performing image matching and depth estimating with plane sweep techniques, and finally obtaining disparity maps and depth maps for the stereo image pairs. In particular embodiments, using approaches other than a deep neural network or other machine-learning techniques may be slower, but in particular embodiments a reconstruction process, such as the process shown in FIG. 1, runs on a GPU, and using a machine-learning process such as a deep neural network may require leaving the GPU pipeline to get the deep neural network results, and then require returning those results and resuming pipeline. Doing this for each image may create issues, e.g., by creating I/O bound problems.

As illustrated in FIG. 1, the disparity map may be used to calculate an initial depth map (depth initialization) 117. If the scene is a static scene, i.e., the decision made by local motion estimation 190 is that there is no local motion in the scene, then the initialized depth map will be accurate and, as illustrated in decision block 191, the reconstruction process can move immediately to step 180 to depth reconstructions for a scene. However, if local motion is present, i.e., the scene is a dynamic scene, then the initialized depth map 117 will be inaccurate for those pixels that correspond to local motion, i.e., that correspond to moving content in the scene. Thus, as shown in FIG. 1, when local motion is detected in a scene, then after depth initialization 117 the example approach of FIG. 1 moves to pixel labelling 150, which begins the process for reconstructing a dynamic scene. Initially, i.e., on the first pass, local motion estimation 190 may include an estimation of which portions (groups of pixels) in a scene include local motion, but this estimation may not correspond to the objects in the scene that are actually moving. Thus, the initial pixel labeling in 150 may be based on the estimate from location motion estimation 190, in that pixels estimated to be part of a region that has local motion will be initially labeled as dynamic pixels and pixels estimated as corresponding to regions that do not have local motion will be initially labeled as static pixels. As shown in 160 and 170 of FIG. 1, iterative refinement to this labeling may be performed.

Figure 3:
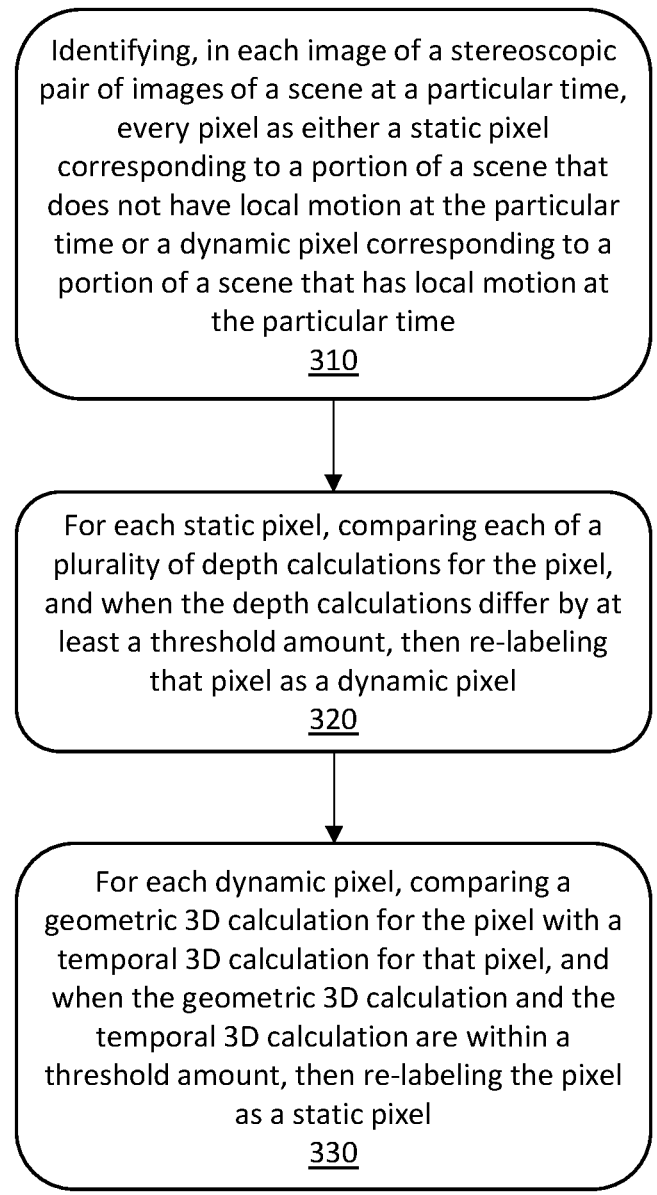
FIG. 3 illustrates an example method for labeling pixels in a dynamic scene reconstruction.

FIG. 3 illustrates an example method for labeling pixels in a dynamic scene reconstruction. The example method of FIG. 3 may begin at step 310, which includes identifying, in each image of a stereoscopic pair of images of a scene at a particular time, every pixel as either a static pixel corresponding to a portion of a scene that does not have local motion at the particular time or a dynamic pixel corresponding to a portion of a scene that has local motion at the particular time. For example, as explained above, each pixel in an image may be initially labeled based on the estimate from location motion estimation 190 in FIG. 1, which may be a rough estimate that identifies areas in which local motion is or is not occurring.

In the example of FIG. 3, step 320 may include, for each static pixel, comparing each of a plurality of depth calculations for the pixel, and when the depth calculations differ by at least a threshold amount, then re-labeling that pixel as a dynamic pixel. In particular embodiments, as shown in FIG. 1, a first one of the depth calculations may be a bundle adjustment process, such as bundle adjustment process 161 to optimize depths. This bundle adjustment may, simultaneously, be used to refine depth information for each pixel labelled as a static pixel, e.g., a refinement of the depth information initially provided by the depth disparity map in 117. For example, the bundle adjustment may take a first pixel p1 from a left image, such as rectified left image 114, and using the calculated 3D information from the scene, p1 may be projected to the corresponding pixel p2 in the right image, i.e., to the pixel in the right image at which the portion of the scene as captured in the left image corresponds to the same portion of the scene but as captured in the right image. This projection may provide depth information, which may be compared to, for example, the depth information provided by depth disparity map in 117.

In particular embodiments, the depth information among the plurality of depth calculations may be compared, such as for example the depth information as determined by the bundle adjustment compared with the depth information form the disparity map in 117. If the disparity between the calculations exceeds a threshold, for example 0.5 pixels, then the pixel may be re-labeled as a dynamic pixel, i.e., as a pixel that corresponds to local motion in the scene. If the disparity between depth calculations is less than the threshold, then the pixel may continue to be labeled as a static pixel, i.e., it's designation as a static pixel does not change. As explained more fully below, once a pixel has been confirmed to be a static pixel or a dynamic pixel (i.e., the pixel enters static process 160 labeled as a static pixel and retains that label at the end of process 160 or enters dynamic process 170 labeled as a dynamic pixel and retains that label at the end of process 170), then that pixel need not be considered during subsequent iterations of the process for labeling static and dynamic pixels. As shown in FIG. 1, label updates 162 may occur after bundle adjustment.

While the discussion above provides an example of a particular threshold, other threshold values (e.g., 0.1 pixel) may be used. In particular embodiments, a threshold value may be pre-determined for a particular camera or combination of cameras, and in particular embodiments, the threshold may vary based on the type of scene (e.g., indoors vs outdoors). In particular embodiments, a threshold may be pre-set on a device prior to delivery to an end user. In particular embodiments, a threshold may be adjustable by a user.

As shown in FIG. 1, in particular embodiments, a depth calculation used in step 320 may also be used to optimize the depth information for the pixels. For example, bundle adjustment 161 may be used as both a depth calculation to determined pixel labels and to optimize depth values for the pixels under consideration. Therefore, in particular embodiments the methods and systems disclosed herein simultaneously optimize depth information and accurately reconstruct a dynamic scene.

As shown in the example of FIG. 3, step 330 may include, for each dynamic pixel, comparing a geometric 3D calculation for the pixel with a temporal 3D calculation for that pixel, and when the geometric 3D calculation and the temporal 3D calculation are within a threshold amount, then re-labeling the pixel as a static pixel. For example, as shown in the example of FIG. 1, step 330 may include a spatial-temporal coherence measure 171. For example, a stereoscopic pair of images at a time t may be used to get 3D information, such as depth information, for each pixel in the images, which may correspond to the geometric 3D calculation. In addition, different images, or frames, from one of the cameras in a sequence of images may be used to determine 3D information, such as depth information, of that pixel. For example, a two-image or a three-image sequence may be used, with each image in the sequence containing the pixel under consideration at a different time. For example, suppose a camera (e.g., the left camera) captures a frame F1 at a time t1, and after moving subsequently captures a second frame F2 at time t2, with each of F1 and F2 containing the point S in the scene being captured. The two frames can be rectified based on the known poses (as explained more fully above) of the camera at times t1 and t2 to produce rectified images r1 and r2. The point S corresponds to point x1 in r1 (i.e., the projection of S in the frame F1 and subsequent rectification to r1) and x2 in r2 such that the epipolar lines are horizontally parallel and the correspondence epipolar lines co-line. Then, the depth information for point S may be determined from the temporal sequence of images in this example by a triangulation equation as depth equals B (the length of the baseline as determined by the camera's positions at time t1 and t2) times f (the focal length of the camera) divided by x1-x2.

The depth information determined using the geometric 3D calculation can be compared to the depth information determined using the temporal calculation, and if the comparison is larger than a threshold, then the pixel does represent content that has local motion, and the pixel continues to be labeled as a dynamic pixel. In contrast, if the comparison less than the threshold, then the pixel does not contain local motion and so the pixel is re-labeled as a static pixel.

As shown in the example of FIG. 1, in particular embodiments a dynamic pixel labelling process may use bundle adjustments 172 to optimize depth information for the dynamic pixels. For example, even if a pixel is correctly initially labeled as dynamic, if there is local motion in the scene, then the process described in disparity map generating 140 will result in errors in depth calculation, so bundle adjustment 172 will provide improved depth values for the dynamic scene. As shown in 173 of FIG. 1, updated pixel labels may be provided after bundle adjustments to the scene.

As illustrated in FIG. 1, static layers (i.e., pixels in a scene that do not correspond to local motion) and dynamic layers (e.g., pixels in the scene that do correspond to local motion) may be determined at the same time (such as in the same process) as depth optimization occurs.

In particular embodiments, at the end of steps 310 and 320, all re-labeled pixels may be re-evaluated according to the new label. For example, all previously dynamic pixels re-labeled as static may be processed under step 310 and all previously static pixels re-labeled as dynamic may be processed under step 320. This processing, re-labeling, and re-processing of re-labeled pixels may continue until a particular threshold, such as a period of time, a number of iterations, a number or percentage of pixels are no longer changing labels, or until all pixels are no longer re-labeled (i.e. steps 310 and 320 don't result in any re-labeled pixels). At that point, depth reconstruction for the scene can be obtained, as shown in 180 of the example of FIG. 1. Then, 3D scene reconstruction can occur, for example using volume-based 3D reconstruction 185 as shown in the example of FIG. 1.

In particular embodiments, scene reconstruction is only performed for key frames output by the cameras. For example, camera tracking 120 may determine pose information, for example based on scene information, and certain images may be identified as key images that represent sequences of images of the scene, such that there are only small differences between the key image and any other image in the sequence represented by the key image. Thus, in particular embodiments, processes such as feature map extraction, disparity map generation, dynamic and static pixel labeling, and scene reconstruction may only be performed for key frames.

In particular embodiments, FIG. 3 may be performed in substantially real-time, for example using the example processes show in FIG. 1. In particular embodiments, FIG. 3 may be performed periodically, e.g., during a scan of an environment before a user starts consuming AR or VR content in that environment. For example, the 3D scene reconstruction may be stored or saved, for example locally or on a connected computing device, and the scene-reconstruction data may be used to determine where and how AR or VR objects are generated and displayed to a user. For example, if an AR object is a cat projected onto the user's environment the user is viewing through, e.g., a head-worn device, then the cat's movements, visibility, and appearance will depend on its 3D location determined relative to the environment, and that determination is made with reference to the 3D scene reconstructed as described herein. Movere, by accounting for dynamic content in a scene, the AR or VR content can more accurately be displayed to the user because the scene is more accurately reconstructed. As noted above, while in particular embodiments AR glasses or head-worn displays are described as examples, the techniques disclosed herein can be used for accurately reconstructing a 3D scene for any system that provides stereoscopic images and position data.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3. Moreover, this disclosure contemplates that some or all of the computing operations described herein, including certain steps of the example method illustrated in FIG. 3, may be performed by circuitry of a computing device described herein, by a processor coupled to non-transitory computer readable storage media, or any suitable combination thereof.

Figure 4:
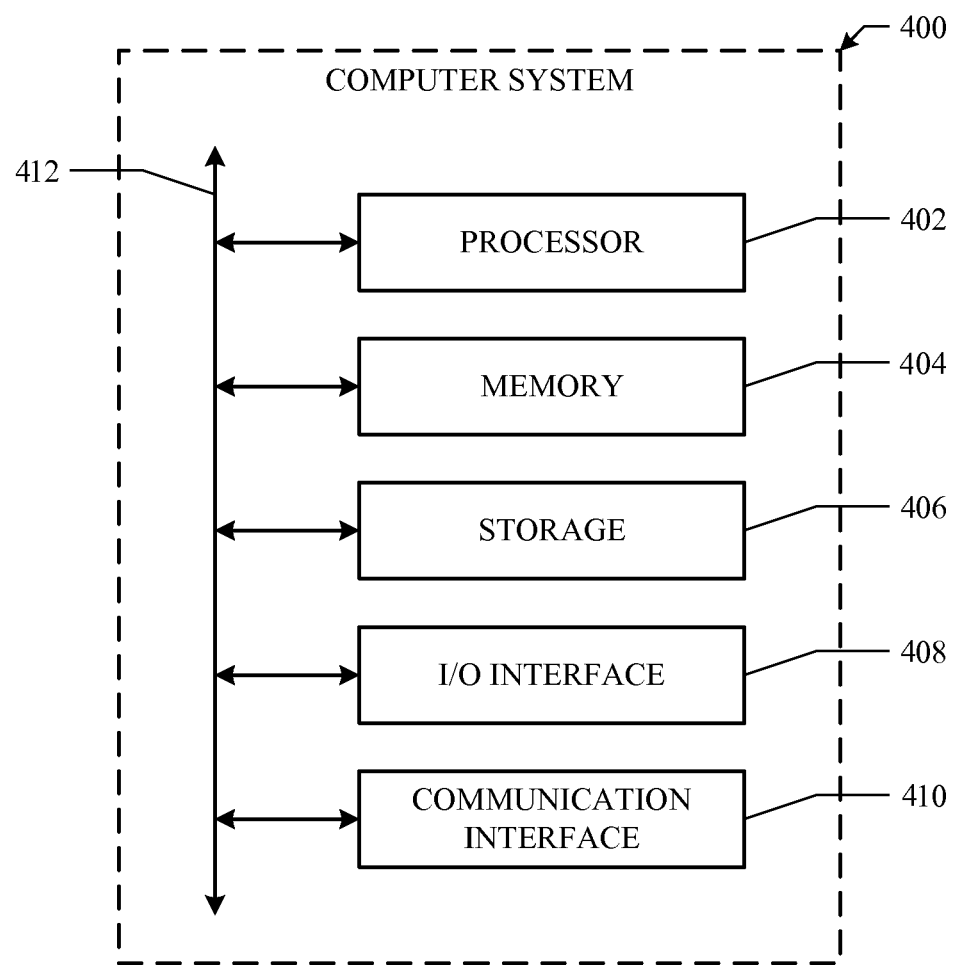
FIG. 4 illustrates an example computing device.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   identifying, in each image of a stereoscopic pair of images of a scene at a particular time, every pixel as either a static pixel corresponding to a portion of a scene that does not have local motion at the particular time or a dynamic pixel corresponding to a portion of a scene that has local motion at the particular time;
   for each static pixel, comparing each of a plurality of depth calculations for the that static pixel, and when at least two of the depth calculations for that static pixel differ from each other by at least a threshold amount, then re-labeling that static pixel as a dynamic pixel;
   for each dynamic pixel, comparing a geometric 3D calculation for the pixel with a temporal 3D calculation for that pixel, and when a difference between the geometric 3D calculation and the temporal 3D calculation is less than a threshold amount, then re-labeling the pixel as a static pixel.

2. The method of claim 1, further comprising when the plurality of depth calculations for a static pixel do not differ by at least the threshold amount, then continuing to label the pixel as a static pixel.

3. The method of claim 1, further comprising when the geometric 3D calculation for a dynamic pixel differs from the temporal 3D calculation for that pixel at least by the threshold amount, then continuing to label the pixel as a dynamic pixel.

4. The method of claim 1, wherein the plurality of depth calculations comprise:
   a first depth calculation based on projecting a first pixel in one of the pair of stereoscopic images to a second pixel in the other one of the pair of stereoscopic images, wherein the first pixel corresponds to the second pixel; and a second depth calculation based on information from a depth map calculated at least in part on one or more feature points in the stereoscopic images.

5. The method of claim 1, wherein:
the geometric 3D calculation comprises calculating depth information for the pixel based on a comparison of the pair of stereoscopic images;
the temporal 3D calculation comprises calculating depth information for the pixel based on a comparison of a plurality of a sequence of images, each image in the sequence corresponding to the scene at a different time.

6. The method of claim 1, further comprising:
for each pixel re-labeled as a static pixel, comparing each of a plurality of depth calculations for the re-labeled static pixel, and when the depth calculations differ by at least a threshold amount, then re-labeling that pixel as a dynamic pixel;
for each pixel re-labeled as a dynamic pixel, comparing each of a plurality of depth calculations for the re-labeled static pixel, and when the depth calculations differ by at least a threshold amount, then re-labeling that pixel as a dynamic pixel.

7. The method of claim 6, further comprising repeating the steps of claim 6 while any pixel is re-labeled.

8. The method of claim 1, further comprising comparing sensor positional data for the cameras capturing the image of the scene with movement data calculated from a sequence of the pair of images over time;
when the comparison exceeds a pre-determined threshold, then reconstructing the scene according to a dynamic 3D scene reconstruction process comprising the steps of claim 1; and
when the comparison does not exceed the pre-determined threshold, then reconstructing the scene according to a static 3D scene reconstruction process.

9. A system comprising one or more processors and a non-transitory computer readable storage media embodying instructions coupled to the one or more processors, the one or more processors operable to execute the instructions to:
identify, in each image of a stereoscopic pair of images of a scene at a particular time, every pixel as either a static pixel corresponding to a portion of a scene that does not have local motion at the particular time or a dynamic pixel corresponding to a portion of a scene that has local motion at the particular time;
for each static pixel, compare each of a plurality of depth calculations for the that static pixel, and when at least two of the depth calculations for that static pixel differ from each other by at least a threshold amount, then re-label that static pixel as a dynamic pixel;
for each dynamic pixel, compare a geometric 3D calculation for the pixel with a temporal 3D calculation for that pixel, and when a difference between the geometric 3D calculation and the temporal 3D calculation is less than a threshold amount, then re-label the pixel as a static pixel.

10. The system of claim 9, wherein when the plurality of depth calculations for a static pixel do not differ by at least the threshold amount, then the one or more processors are further operable to execute the instructions to continue to label the pixel as a static pixel.

11. The system of claim 9, wherein when the geometric 3D calculation for a dynamic pixel differs from the temporal 3D calculation for that pixel at least by the threshold amount, then the one or more processors are further operable to execute the instructions to continue to label the pixel as a dynamic pixel.

12. The system of claim 9, wherein the plurality of depth calculations comprise:
a first depth calculation based on projecting a first pixel in one of the pair of stereoscopic images to a second pixel in the other one of the pair of stereoscopic images, wherein the first pixel corresponds to the second pixel; and
a second depth calculation based on information from a depth map calculated at least in part on one or more feature points in the stereoscopic images.

13. The system of claim 9, wherein:
the geometric 3D calculation comprises calculating depth information for the pixel based on a comparison of the pair of stereoscopic images;
the temporal 3D calculation comprises calculating depth information for the pixel based on a comparison of a plurality of a sequence of images, each image in the sequence corresponding to the scene at a different time.

14. The system of claim 9, wherein the one or more processors are further operable to execute the instructions to:
for each pixel re-labeled as a static pixel, compare each of a plurality of depth calculations for the re-labeled static pixel, and when the depth calculations differ by at least a threshold amount, then re-label that pixel as a dynamic pixel;
for each pixel re-labeled as a dynamic pixel, compare each of a plurality of depth calculations for the re-labeled static pixel, and when the depth calculations differ by at least a threshold amount, then re-label that pixel as a dynamic pixel.

15. The system of claim 14, wherein the one or more processors are further operable to execute the instructions to repeat the operations of claim 14 while any pixel is re-labeled.

16. The system of claim 9, wherein the one or more processors are further operable to execute the instructions to:
compare sensor positional data for the cameras capturing the image of the scene with movement data calculated from a sequence of the pair of images over time;
when the comparison exceeds a pre-determined threshold, then reconstruct the scene according to a dynamic 3D scene reconstruction process comprising the steps of claim 1; and
when the comparison does not exceed the pre-determined threshold, then reconstruct the scene according to a static 3D scene reconstruction process.

17. One or more non-transitory computer readable storage media embodying instructions and coupled to one or more processors that are operable to execute the instructions to:
identify, in each image of a stereoscopic pair of images of a scene at a particular time, every pixel as either a static pixel corresponding to a portion of a scene that does not have local motion at the particular time or a dynamic pixel corresponding to a portion of a scene that has local motion at the particular time;
for each static pixel, compare each of a plurality of depth calculations for the that static pixel, and when at least two of the depth calculations for that static pixel differ from each other by at least a threshold amount, then re-label that static pixel as a dynamic pixel;
for each dynamic pixel, compare a geometric 3D calculation for the pixel with a temporal 3D calculation for that pixel, and when a difference between the geometric 3D calculation and the temporal 3D calculation is less than a threshold amount, then re-label the pixel as a static pixel.

18. The media of claim 17, wherein when the plurality of depth calculations for a static pixel do not differ by at least the threshold amount, then the one or more processors are further operable to execute the instructions to continue to label the pixel as a static pixel.

19. The media of claim 17, wherein when the geometric 3D calculation for a dynamic pixel differs from the temporal 3D calculation for that pixel at least by the threshold amount, then the one or more processors are further operable to execute the instructions to continue to label the pixel as a dynamic pixel.

20. The media of claim 17, wherein:
the geometric 3D calculation comprises calculating depth information for the pixel based on a comparison of the pair of stereoscopic images;
the temporal 3D calculation comprises calculating depth information for the pixel based on a comparison of a plurality of a sequence of images, each image in the sequence corresponding to the scene at a different time.

\* \* \* \* \*